US008791814B2

(12) United States Patent
Albsmeier et al.

(10) Patent No.: US 8,791,814 B2
(45) Date of Patent: Jul. 29, 2014

(54) REMOTE ANNUNCIATOR

(75) Inventors: Eric D. Albsmeier, Sheboygan, WI (US); Michael T. Little, Sheboygan, WI (US); Anthony J. Hackbarth, Sheboygan, WI (US)

(73) Assignee: Kohler Company, Kohler, WI (US)

( * ) Notice: Subject to any disclaimer, the term of this patent is extended or adjusted under 35 U.S.C. 154(b) by 22 days.

(21) Appl. No.: 13/559,636

(22) Filed: Jul. 27, 2012

(65) Prior Publication Data
US 2014/0028452 A1    Jan. 30, 2014

(51) Int. Cl.
*G08B 29/00*        (2006.01)
(52) U.S. Cl.
USPC ............. 340/515; 340/648; 340/657; 307/39; 307/64; 307/109; 307/115; 307/149
(58) Field of Classification Search
CPC ...................................................... G05B 32/02
USPC ............. 340/515, 648, 657; 307/39, 64, 109, 307/115, 149
See application file for complete search history.

(56) References Cited

U.S. PATENT DOCUMENTS

| | | | |
|---|---|---|---|
| 4,672,227 A | 6/1987 | Lagree | |
| 6,163,088 A * | 12/2000 | Codina et al. | 307/64 |
| 6,876,103 B2 | 4/2005 | Radusewicz et al. | |
| 7,362,696 B2 | 4/2008 | Ferry et al. | |
| 7,436,287 B1 | 10/2008 | Bollin | |
| 7,569,949 B2 | 8/2009 | Lathrop | |
| 7,889,089 B1 | 2/2011 | Bollin | |
| 2004/0076148 A1 | 4/2004 | Ferry | |
| 2005/0141154 A1 * | 6/2005 | Consadori et al. | 361/62 |
| 2006/0028069 A1 | 2/2006 | Loucks et al. | |
| 2008/0179967 A1 | 7/2008 | Lathrop et al. | |
| 2010/0038966 A1 | 2/2010 | Espeut, Jr. | |
| 2010/0250160 A1 | 9/2010 | Spitaels | |
| 2011/0254370 A1 * | 10/2011 | Wischstadt et al. | 307/39 |
| 2011/0291847 A1 * | 12/2011 | Gilpatrick | 340/657 |
| 2012/0105098 A1 | 5/2012 | Hancock et al. | |

FOREIGN PATENT DOCUMENTS

EP         2448087 A1        5/2012

OTHER PUBLICATIONS

"Be sure your backup power supply is ready": PowerLogic® Emergency Power Supply System, [online]. © 2009 Schneider Electric, [retrieved on Nov. 19, 2012]. Retrieved from the Internet: <URL: http://www.powerlogic.com/literature/3000BRO803R309_EPSSWeb1.pdf>, (Mar. 2009), 6 pgs.

"European Application Serial No. 13003628,8, European Search Report mailed Feb. 19, 2014", 10 pgs.

(Continued)

*Primary Examiner* — Tai T Nguyen
(74) *Attorney, Agent, or Firm* — Schwegman, Lundberg & Woessner, P.A.

(57) ABSTRACT

Some embodiments relate to a remote annunciator 10 that includes an enclosure 11 and a control 12 within the enclosure 11. The control 12 receives signals S from a plurality of transfer switches 13A, 13B, 13C, 13D and at least one generator 14 that is connected to at least one of the transfer switches 13A, 13B, 13C, 13D. The control 12 displays a status of electrical connections that include the plurality of transfer switches 13A, 13B, 13C, 13D and the at least one generator 14. In some embodiments, the control 12 recognizes when the plurality of transfer switches 13A, 13B, 13C, 13D and the at least one generator 14 are connected to the control 12.

19 Claims, 3 Drawing Sheets

(56) References Cited

OTHER PUBLICATIONS

GE Digital Energy: "EVMon_print EnerVista™ Viewpoint Monitoring Brochure (print version)", [online]. [retrieved on Jan. 29, 2014]. Retrieved from the Internet: <URL: http://www.gedigitalenergy.com/multilin/enervista/brochures.htm>, (Dec. 13, 2011), 12 pgs.

* cited by examiner

REMOTE ANNUNCIATOR

TECHNICAL FIELD

Embodiments pertain to a remote annunciator, and more particularly to a remote annunciator that displays a status of electrical connections between a plurality of transfer switches and at least one generator.

BACKGROUND

Many existing remote annunciators offer support for either a single genset or a single genset and single ATS unit. One of the drawbacks with such systems is that there are typically many gensets that are installed with multiple ATS units. Therefore, multiple remote annunciators are usually required in order to adequately monitor multiple ATS's and gensets. This requirement for multiple remote annunciators adds unwanted cost and complexity to remotely monitoring various electrical systems that include such components.

Some existing remote annunciators are able to annunciate with more than one ATS. However, these types of remote annunciators are unable to annunciate any type of genset status. Therefore, one of the drawbacks is such remote annunciator is that an additional type of remote annunciator is typically required in order to adequately monitor the status of the genset and the multiple ATS's.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
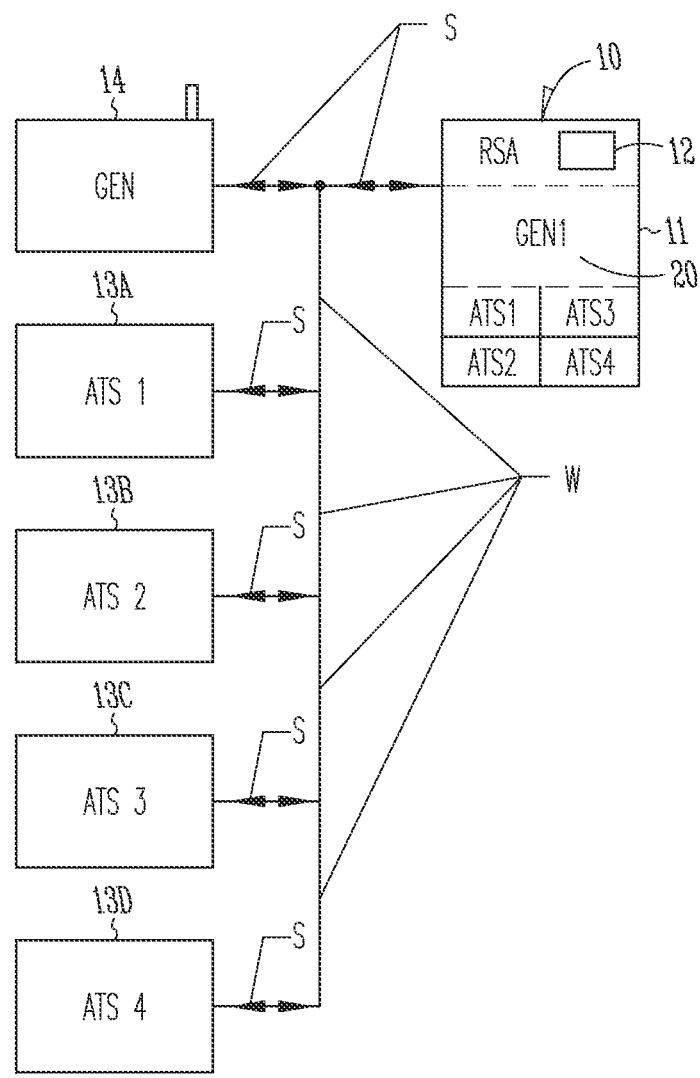
FIG. 1 is a schematic view illustrating an example remote annunciator that includes wired connections with multiple ATS's and at least one generator.

FIG. 1 illustrates an example remote annunciator 10 that includes an enclosure 11 and a control 12 within the enclosure 11. The control 12 receives signals S from a plurality of transfer switches 13A, 13B, 13C, 13D and at least one generator 14 that is connected to at least one of the transfer switches 13A, 13B, 13C, 13D. The control 12 displays a status of electrical connections that include the plurality of transfer switches 13A, 13B, 13C, 13D and the at least one generator 14.

In some embodiments, the control 12 recognizes when the plurality of transfer switches 13A, 13B, 13C, 13D and the at least one generator 14 are connected to the control 12.

As shown in FIG. 1, the control 12 is connected to the plurality of transfer switches 13A, 13B, 13C, 13D and the at least one generator 14 via a wired connection W. The control 12 sends out signals S to the plurality of transfer switches 13A, 13B, 13C, 13D and the at least one generator 14 via the wired connection W to determine a status of the plurality of transfer switches 13A, 13B, 13C, 13D and the at least one generator 14. In some embodiments, the control 12 sends signals to the plurality of transfer switches 13A, 13B, 13C, 13D and the at least one generator 14 via the wired connection W to determine a status of the electrical connections that include the plurality of transfer switches 13A, 13B, 13C, 13D and the at least one generator 14.

As an example, the control 12 may be connected to the plurality of transfer switches 13A, 13B, 13C, 13D and the at least one generator 14 via a wired ModBus RTU connection. As another example, the control 12 may be connected to the plurality of transfer switches 13A, 13B, 13C, 13D and the at least one generator 14 via a wired ModBus TCP connection. Embodiments are also contemplated where the control 12 broadcasts signals S (see FIG. 2) to the plurality of transfer switches 13A, 13B, 13C, 13D and the at least one generator 14 via an Ethernet UDP connection to determine a status of the electrical connections that include the plurality of transfer switches 13A, 13B, 13C, 13D and the at least one generator 14.

Figure 2:
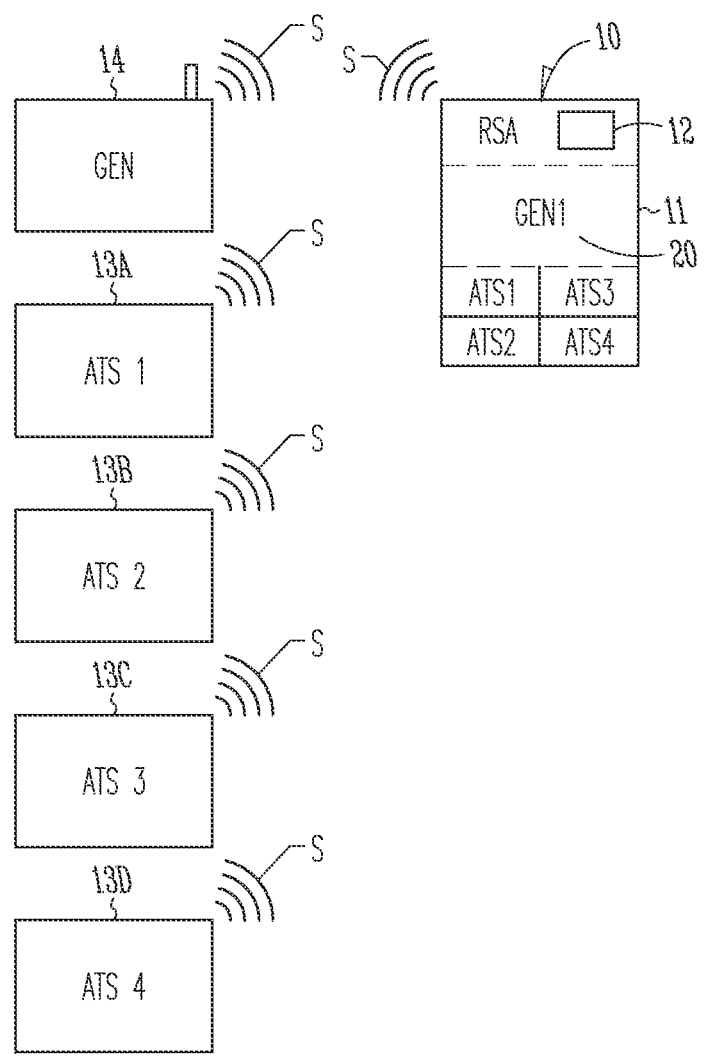
FIG. 2 is a schematic view illustrating an example remote annunciator that includes wireless connections with multiple ATS's and at least one generator.

As shown in FIG. 2, the control 12 may be connected to the plurality of transfer switches 13A, 13B, 13C, 13D and the at least one generator 14 via a wireless connection. In some embodiments, the control 12 receives wireless signals from the plurality of transfer switches 13A, 13B, 13C, 13D and the at least one generator 14 via the wireless connection to determine a status of the plurality of transfer switches 13A, 13B, 13C, 13D and the at least one generator 14.

As an example, the control 12 may receive signals from the plurality of transfer switches 13A, 13B, 13C, 13D and the at least one generator 14 to determine a status of the electrical connections that include the plurality of transfer switches 13A, 13B, 13C, 13D and the at least one generator 14. Embodiments are contemplated where the control 12 is connected to the plurality of transfer switches 13A, 13B, 13C, 13D and the at least one generator 14 via a wireless ModBus TCP connection.

As shown in FIGS. 1 and 2, the remote annunciator 10 may further include an indicator 20 that displays a status of the electrical connections that include the plurality of transfer switches 13A, 13B, 13C, 13D and the at least one generator 14. One example indicator 20 that may be provided with the remote annunciator 110 is shown in detail in FIG. 3.

Figure 3:
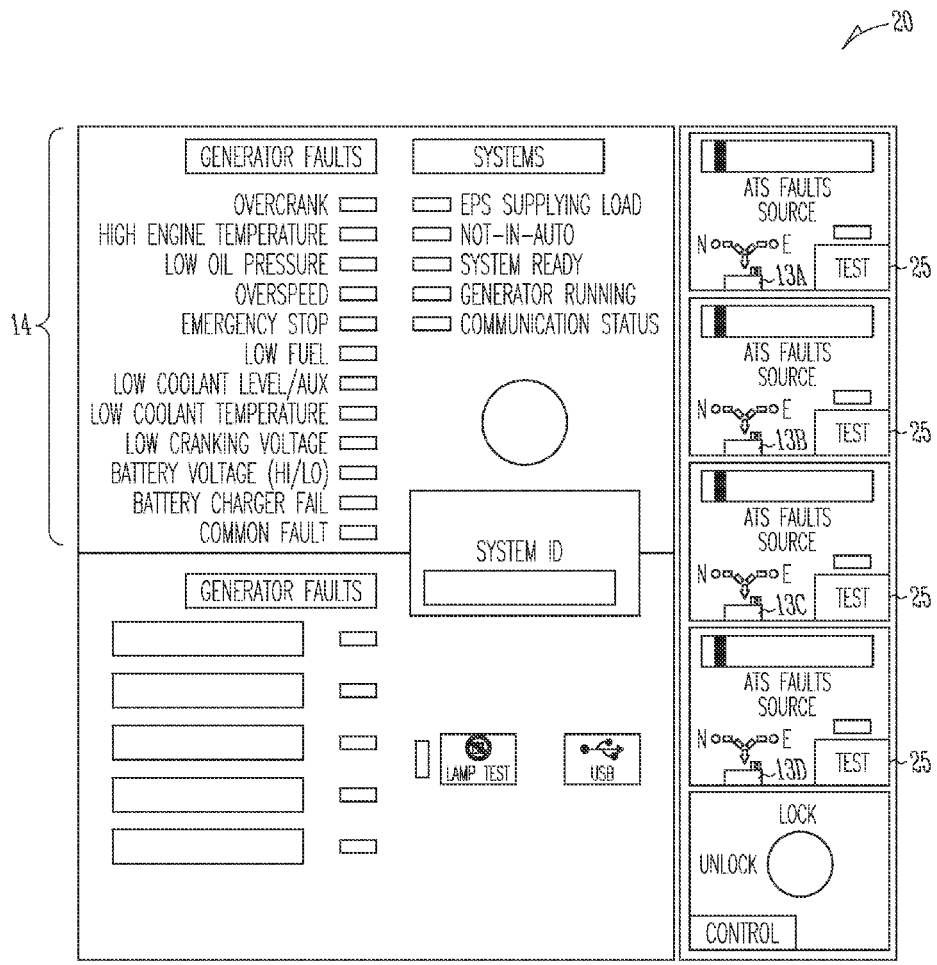
FIG. 3 illustrates an example indicator that may be used with the example remote annunciators that are illustrated in FIGS. 1 and 2.

As shown in FIG. 3, the indicator 20 includes at least one LED that displays a status of the plurality of transfer switches 13A, 13B, 13C, 13D (4 are shown in FIG. 3) and the at least one generator 14 (one is shown in FIG. 3). In the example embodiment that is illustrated in FIG. 3, the indicator 20 includes at least one LED that displays a status of the electrical connections that include plurality of transfer switches 13A, 13B, 13C, 13D (4 are shown in FIG. 3) and the at least one generator 14 (one is shown in FIG. 3).

Other embodiments are contemplated where the indicator 20 includes at least one LCD (not shown) that displays a status of the plurality of transfer switches 13A, 13B, 13C, 13D and the at least one generator 14. As an example, the indicator 20 may include at least one LCD that displays a status of the electrical connections that include plurality of transfer switches 13A, 13B, 13C, 13D and the at least one generator 14.

As shown in FIG. 3, the remote annunciator 10 may further include further include a test button 25 that is connected to the control 12. The control 12 may simulate a power outage at any or more of the plurality of transfer switches 13A, 13B, 13C, 13D once the test button 25 is activated, in the example embodiment that is shown in FIG. 3, the remote annunciator 10 further includes a plurality of test buttons 25 that are each connected to the control 12. The control 12 is able to simulate a power outage at a particular one of the plurality of transfer switches 13A, 13B, 13C, 13D once the test button 25 that is associated with the particular one of the plurality of transfer switches 13A, 13B, 13C, 13D is activated.

Embodiments are contemplated where the remote annunciator includes a selector switch (not shown in FIGS.) that is connected to the control 12. In embodiments that include a selector switch, the control 12 may simulate a power outage at a particular one of the plurality of transfer switches 13A, 13B, 13C, 13D based on the position of the selector switch once the singular test button 25 is activated.

The remote annunciators 10 described herein offer support for multiple ATS units and at least one genset. Therefore, multiple remote annunciators are not required in order to adequately monitor multiple ATS's and gensets. Therefore, the remote annunciators 10 described herein reduce unwanted cost and complexity that are associated with remotely monitoring various electrical systems that include such components.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A remote annunciator comprising:
an enclosure; and
a control within the enclosure, wherein the control receives signals from a plurality of transfer switches and at least one generator that is connected to at least one of the transfer switches, wherein the control displays a status of electrical connections that include the plurality of transfer switches and the at least one generator, wherein the control sends out signals to the plurality of transfer switches and the at least one generator via a connection to determine a status of the plurality of transfer switches and the at least one generator.

2. The remote annunciator of claim 1, wherein the control recognizes when the plurality of transfer switches and the at least one generator are connected to the control.

3. The remote annunciator of claim 1, wherein the control is connected to the plurality of transfer switches and the at least one generator via a wired connection.

4. The remote annunciator of claim 3, wherein the control is connected to the plurality of transfer switches and the at least one generator via a wired ModBus RTU connection.

5. The remote annunciator of claim 3, wherein the control is connected to the plurality of transfer switches and the at least one generator via a wired ModBus TCP connection.

6. The remote annunciator of claim 1, wherein the control is connected to the plurality of transfer switches and the at least one generator via a wireless connection.

7. The remote annunciator of claim 6, wherein the control receives wireless signals from the plurality of transfer switches and the at least one generator via the wireless connection to determine a status of the plurality of transfer switches and the at least one generator.

8. The remote annunciator of claim 6, wherein the control receives signals from the plurality of transfer switches and the at least one generator to determine a status of the electrical connections that include the plurality of transfer switches and the at least one generator.

9. The remote annunciator of claim 6, wherein the control is connected to the plurality of transfer switches and the at least one generator via a wireless ModBus TCP connection.

10. The remote annunciator of claim 1, further comprising an indicator that displays a status of the electrical connections that include the plurality of transfer switches and the at least one generator.

11. The remote annunciator of claim 10, wherein the indicator includes at least one LED that displays a status of the plurality of transfer switches and the at least one generator.

12. The remote annunciator of claim 10, wherein the indicator includes at least one LED that displays a status of the electrical connections that include plurality of transfer switches and the at least one generator.

13. The remote annunciator of claim 10, wherein the indicator includes at least one LCD that displays a status of the plurality of transfer switches and the at least one generator.

14. The remote annunciator of claim 13, wherein the indicator includes at least one LCD that displays a status of the electrical connections that include plurality of transfer switches and the at least one generator.

15. The remote annunciator of claim 1, further comprising a test button that is connected to the control, wherein the control simulates a power outage at any of the plurality of transfer switches once the test button is activated.

16. The remote annunciator of claim 15, further comprising a plurality of test buttons that are each connected to the control, wherein the control simulates a power outage at a particular one of the plurality of transfer switches once the test button that is associated with the particular one of the plurality of transfer switches is activated.

17. A remote annunciator comprising:
an enclosure; and
a control within the enclosure, wherein the control receives signals from a plurality of transfer switches and at least one generator that is connected to at least one of the transfer switches, wherein the control displays a status of electrical connections that include the plurality of transfer switches and the at least one generator, wherein the control broadcasts signals to the plurality of transfer switches and the at least one generator via a connection to determine a status of the electrical connections that include the plurality of transfer switches and the at least one generator.

18. A remote annunciator comprising:
an enclosure; and
a control within the enclosure, wherein the control receives signals from a plurality of transfer switches and at least one generator that is connected to at least one of the transfer switches, wherein the control displays a status of electrical connections that include the plurality of transfer switches and the at least one generator, wherein the control broadcasts signals to the plurality of transfer switches and the at least one generator via an Ethernet UDP connection to determine a status of the electrical connections that include the plurality of transfer switches and the at least one generator.

19. A remote annunciator comprising:
an enclosure; and
a control within the enclosure, wherein the control receives signals from a plurality of transfer switches and at least one generator that is connected to at least one of the transfer switches, wherein the control displays a status of electrical connections that include the plurality of transfer switches and the at least one generator, wherein the control simulates a power outage at a particular one of the plurality of transfer switches based on a position of a selector switch once a test button is activated.

* * * * *